Nov. 9, 1948. R. H. DOBBS 2,453,204
EARTH BORING MACHINE
Filed Oct. 24, 1946 3 Sheets-Sheet 1

INVENTOR.
R. H. DOBBS.

Nov. 9, 1948.     R. H. DOBBS     2,453,204
EARTH BORING MACHINE
Filed Oct. 24, 1946     3 Sheets-Sheet 2

Fig. 2

INVENTOR.
R. H. DOBBS.
BY

Nov. 9, 1948.  R. H. DOBBS  2,453,204
EARTH BORING MACHINE
Filed Oct. 24, 1946  3 Sheets-Sheet 3
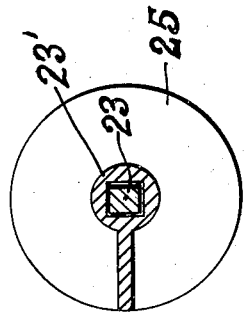
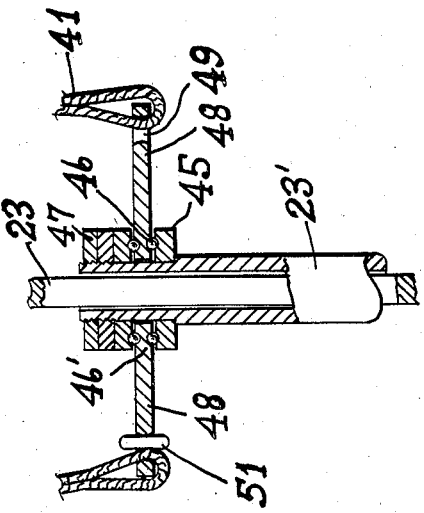
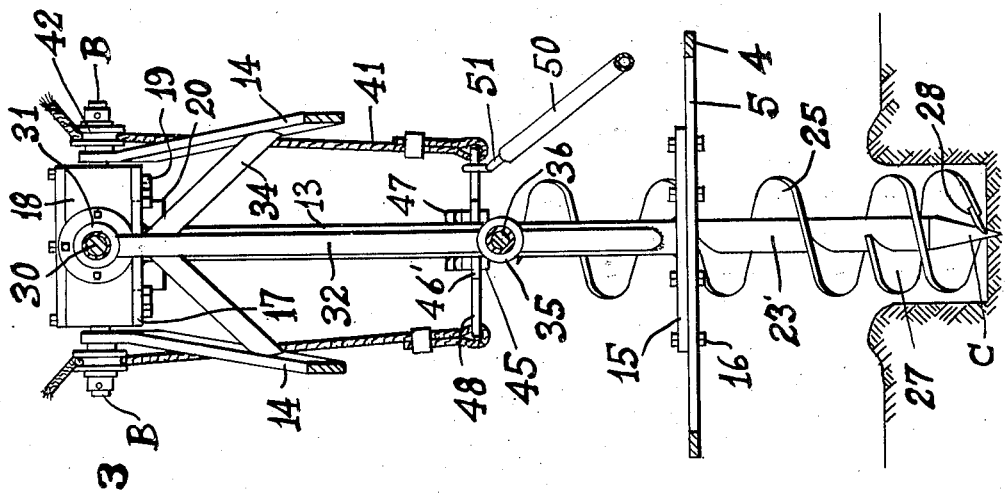
INVENTOR.
R. H. DOBBS.

Patented Nov. 9, 1948

2,453,204

UNITED STATES PATENT OFFICE 2,453,204

EARTH BORING MACHINE

Richard H. Dobbs, Atlanta, Kans.

Application October 24, 1946, Serial No. 705,355

1 Claim. (Cl. 255—19)

This invention relates to an earth boring machine, and has for its principal object the provision of an auger telescopically engaging with a universally suspended driven shaft to bore holes of great depth for securing fence posts, telephone poles, or the like, vertically.

A further object of this invention is to construct a machine that requires no adjustment in its operation of boring as the auger automatically bores itself into the earth by its own weight under ordinary ground conditions, however, in the case of soft earth, the auger may be controlled in its downward movement by a cable system, and furthermore in the case of the ground being hard, weight may be imposed on the auger to speed up its boring.

A still further object of this invention is to provide means to rigidly support, rearwardly of the tractor, a driving mechanism for the auger and its driven shaft, the driven shaft of the auger being pivotally connected to the driving mechanism to vertically plumb the auger at all times regardless the location of the land on which the tractor is positioned.

A still further object of the invention is to construct a machine that is simple to operate, efficient in its performance, and easily attached to a tractor without altering any parts of said tractor.

These and other objects will hereinafter be more fully explained, reference being had to the accompanying drawings forming a part of this specification, and in which like characters will apply to like parts in the different views.

Referring to the drawings:

Fig. 2 is a top plan view of Fig. 1.

Fig. 3 is a sectional view taken on line 3—3 in Fig. 1.

Fig. 4 is a sectional view taken on line 4—4 in Fig. 1.

Fig. 5 is a sectional view of the thrust bearing and auger carrying support, the cables, auger and driven shaft fragmentarily shown.

Figure 1:
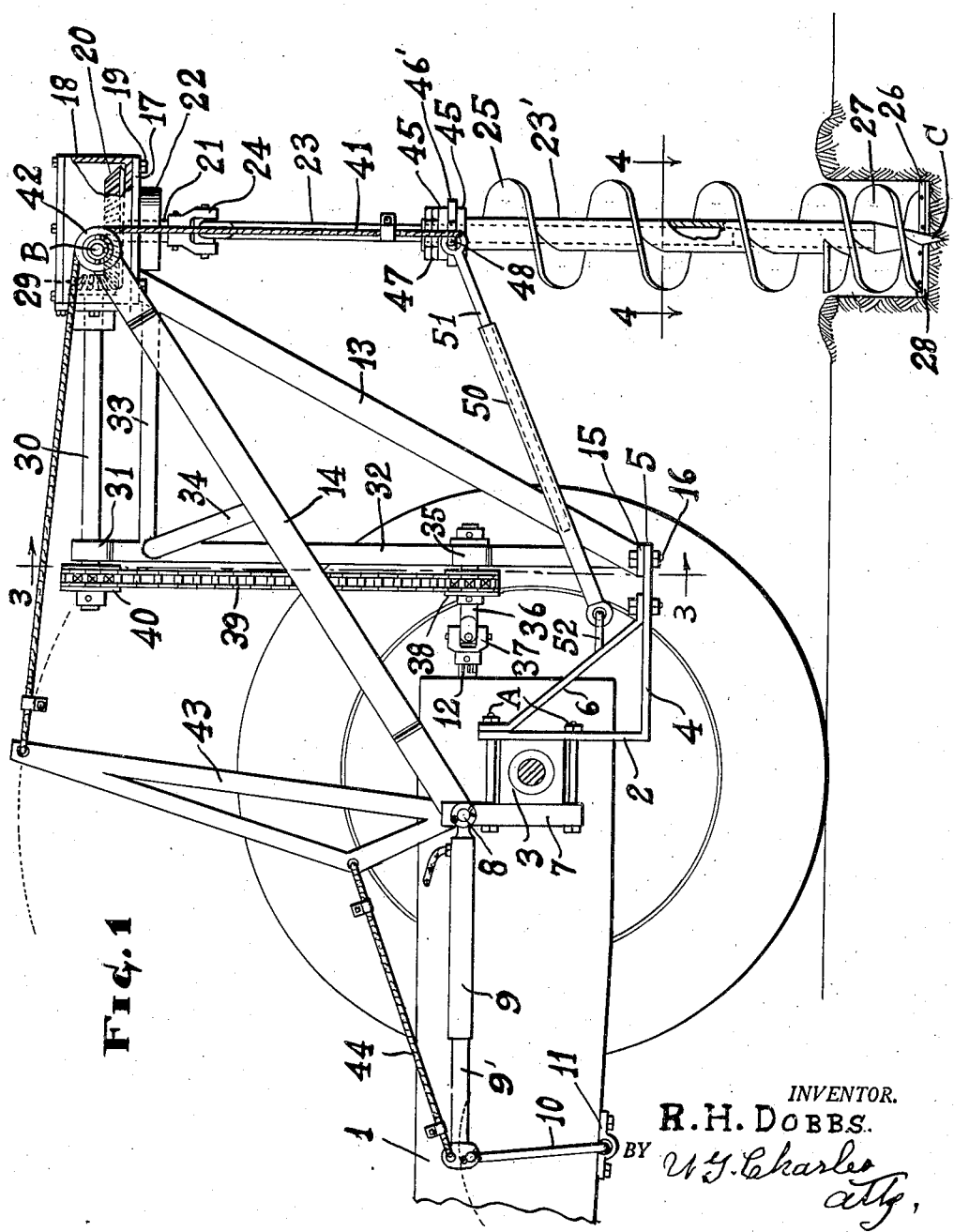
Fig. 1 is a side elevation of a tractor and earth boring machine as attached thereto, a portion of the tractor and one traction wheel thereof being removed for convenience of illustration.

The invention herein disclosed relates to an earth boring machine that is operated and attached to a conventional tractor 1, said tractor being fragmentarily shown in Figs. 1 and 2.

It will be seen that the tractor is equipped with a conventional hitch, said hitch comprising a downwardly extending portion 2 secured to each side of the tractor and being rearwardly of the axle 3, and a right angle bent portion 4 horizontally disposed and extending rearwardly from the lower end of portion 2. A cross bar 5 connects the rear ends of the portions 4 to function as means to attach implements as conveyed by the tractor, said horizontally disposed portion 4 being braced by a member 6. Secured forwardly of the axle 3 and oppositely of the hitch is a rectangular hollow member 7 secured by bolts A extending therethrough and spaced apart to receive the axle therebetween, said bolts extending from the axle to receive portion 2 of the hitch as clamping means to rigidly secure the hitch and hollow member 7. The upper end of the hollow member 7 extends upwardly a spaced distance from the axle and is bored to receive a king pin 8, to which is rockably secured a conventional hydraulic cylinder 9 that is actuated and controlled by the usual equipment of the tractor, said equipment not being shown in the drawings. The free end of the piston 9' of the cylinder is supported upwardly by a U-shaped frame 10 that is carried by a bearing 11 at the lower side of the tractor as shown in Fig. 1. It will also be seen that the tractor is equipped with the usual power take-off shaft 12 that rearwardly extends from the tractor.

Referring now to the invention, it will be seen that the same is carried by arms comprising a tube 13 and a pair of braces 14, said tube and braces extending upwardly and rearwardly from the tractor and converging toward each other. The lower end of the tube 13 is welded to a bar 15, which rests on the horizontal member 4 of the hitch centrally thereof and secured thereto by bolts 16. The upper end of the tube 13 is welded to a U-shaped plate 17 as supporting means for a gear casing 18, and being secured thereto by bolts 19 passing through the U-shaped plate and engaging into the casing 18. The lower ends of the braces are connected to their respective king pins 8, while the upper ends thereof are secured to the sides of the gear casing by spindles B integrally secured to the casing and receiving the apertured ends of their respective braces. By the arrangement thus described, the gear casing will be positioned at a fixed point with respect to the tractor and void of adjustment or rocking movement.

Rotatably positioned in the gear casing is a bevel gear 20 having a shaft 21 integrally connected axially thereof, said shaft being vertically positioned and journalled in a bearing 22 arranged on the gear casing and extending downward therefrom. Said shaft 21 at its lower end is secured to an auger driving shaft 23 through the medium of a universal joint connection 24 whereby the auger shaft 23 is automatically plumbed in a vertical position at all times regardless the setting position of the gear casing to bore a hole vertically without any adjustment of the machine.

The auger driving shaft 23 is rectangular in cross section to receive a tube 23' of the auger slidable thereon longitudinally, said tube having a rectangular opening to substantially coincide with the driving shaft whereby as the shaft rotates, the same will impart rotating motion to the auger tube. Joined integrally to the tube 23' is the auger vane 25, the lower end of which has a blade 26 secured thereto as cutting means for the auger when boring. At the lower end of the auger is a convolution of an auxiliary vane 27 secured to the tube between the last convolution of vane 25, the lower end of last said vane also having a blade 28 secured thereto to function in like manner to that of the first said blade. In the operation of the machine, the blades will co-act to cut into the earth as turned about the auger axis while the auxiliary auger portion will assist in conveying earth upward to be deposited peripherally on the outside of the hole. When the required depth of boring is accomplished, the auger is raised to displace the earth being positioned between the convolutions of the main auger and the auxiliary auger. A small portion of loose earth may fall back into the hole, but the depth of the hole is increased to allow for such. It will be seen that the auger tube is pointed as at C to penetrate the earth in advance of the auger to direct the auger vertically downward in the process of boring.

During the time of idleness of the boring machine, or when the same is being moved, the auger is raised to clear its lower end from contact with the ground, in which case, the upper end of the auger tube 23' will contact the universal joint connection 24 and is so retained until in operation. When in operation, the auger tube 23' is released and permitted to work downwardly into the earth under its own weight as said auger is built comparatively heavy to force into the earth as the same is rotated by the driven shaft. It will be seen that a great depth of boring is possible by the telescopic engagement of the tube and shaft, and as well as the over-all height of the machine is not objectionable.

In mesh with the said bevel gear 20 is another bevel gear 29, last said bevel gear having one end of a horizontal shaft 30 integral therewith, said shaft being journalled in the gear casing and extending toward the tractor. The other end of the shaft is journalled in a bearing 31 that is supported on the upper end of a vertically disposed upright 32. The upright 32 has its lower end secured to the lower end of the tube 13, and being braced by a horizontal member 33 and lateral braces 34 that have one of their ends secured to the upright, while the other ends are secured to their respective braces 14.

Positioned in the upright a spaced distance upward from its lower end is a bearing 35 that is in alignment with the power take-off shaft of the tractor to receive a shaft 36, said shaft being connected to the power take-off shaft by a universal joint connection 37. Secured to the shaft 36 adjacent the universal joint connection is a sprocket 38 over which a chain 39 engages to drive another sprocket 40 that is secured to the last said end of the horizontal shaft 30 whereby as the power take-off shaft is rotated in the usual manner, the auger mechanism will rotate through the medium of the chain and bevel gears.

To raise the auger when the required depth of hole is accomplished, cables 41 are provided to engage over pulleys 42 that are rotatably mounted on the gear casing spindle B, one pair of corresponding ends of the cables being secured to the upper end of the auger, while the other ends of the cables are secured to the free ends of rockable frames 43, the lower ends of which are rockably carried by the king pins 8. Cables 44 connect the piston 9' of the hydraulic cylinder with the frame members 43 a spaced distance upward from their rockable point. When the pistons are extended outwardly from their cylinders, the frame members will be rocked to raise the auger through the medium of the cables 41. In the process of boring, the auger may be controlled in its downward movement by the hydraulic cylinders, however in the case of hard earth, the cables may be released entirely and weight imposed on the upper end of the auger to force the same downwardly for rapid boring.

Fig. 5 illustrates the arrangement for securing the cables to the upper end of the auger. The auger tube is reduced in diameter externally to form a shoulder on which will engage a circular plate 45, the upper face of which has a groove for the reception of balls 46. Spaced upwardly from plate 45 is another similar plate and balls, except the same is inverted to function as a bearing for an intermediately positioned plate 46' positioned between the first said plates. Nuts 47 are provided on the outer end of the tube to retain the plate members from upward movement. Extending oppositely from the intermediate plate are ears 48 having apertures 49 for the reception of the lower ends of the said cables 41.

To retain the intermediate plate from rotating with the auger is through the medium of a pair of telescopically engaging cylindrical members 50 and 51. Member 51 is rockably secured to one ear of the plate 46', while the member 50 is rockably secured to an ear 52 that is integrally joined to brace 6 of the hitch. The rocking and telescopic engagement of the members 50 and 51 will permit the auger to raise and lower as well as rock with respect to the tractor but will retain the intermediate plate to which the cables are secured from rotation.

Modifications may be made as lie within the scope of the appended claim.

Having fully described my invention what I claim as new and desire to secure by Letters Patent is:

In an auger boring machine comprising a frame consisting of a centrally disposed tube and a pair of braces, said tube and braces extending upwardly and rearwardly of a tractor and having their lower ends secured to the tractor, a U-shaped plate secured to the upper end of the tube, a gear casing mounted upon the U-shaped plate, said casing having spindles extending from its sides to receive the respective upper ends of the braces to stationarily retain the gear casing, bevel gears positioned in said gear casing, a shaft extending downwardly from one bevel gear, an auger driving shaft depending downwardly and universally connected to the lower end of the first said shaft, an auger having a tube to telescopically engage on the driving shaft, said driving shaft being rectangular in cross section to fit in a rectangular opening longitudinally through the tube, a horizontal shaft extending forwardly from the other bevel gear, an upright frame to serve as a bearing for the forward end of the shaft, sprocket and chain means connecting the forward end of last said shaft with a power take-off of said tractor, pulleys mounted on the spindles of the casing, cables engaging over the pulleys and extending downwardly and terminating adjacent the upper end of the auger tube, a plate to which the lower ends of the cables are attached and in which the upper end of the auger tube is rotatably mounted, a pair of telescopically engaging members to retain the last said plate from rotating with the auger tube, and power means on the tractor connected to the other ends of the said cables to raise and lower the auger.

RICHARD H. DOBBS.

REFERENCES CITED

The following references are of record in the file of this patent:

UNITED STATES PATENTS

| Number | Name | Date |
|---|---|---|
| 1,370,430 | Goldner | Mar. 1, 1921 |
| 1,507,776 | Humiston | Sept. 9, 1924 |
| 1,844,778 | Meunier | Feb. 9, 1932 |
| 2,251,506 | Tichy, Jr. | Aug. 5, 1941 |
| 2,320,775 | Garner | June 1, 1943 |